United States Patent [19]
Borota, Jr.

[11] 4,135,187
[45] Jan. 16, 1979

[54] TRANSPONDER DECODER/ENCODER CIRCUITRY

[75] Inventor: Milan Borota, Jr., Olathe, Kans.

[73] Assignee: King Radio Corporation, Olathe, Kans.

[21] Appl. No.: 688,181

[22] Filed: May 20, 1976

[51] Int. Cl.² ............................................... G01S 9/56
[52] U.S. Cl. ............................................... 343/6.8 LC
[58] Field of Search ........... 343/6.5 R, 6.5 LC, 6.8 R, 343/6.8 LC

[56] References Cited
U.S. PATENT DOCUMENTS

| | | | |
|---|---|---|---|
| 2,671,850 | 3/1954 | Marcou | 343/6.8 R X |
| 3,079,557 | 2/1963 | Crabtree | 343/6.8 R X |
| 3,512,154 | 5/1970 | Farrar | 343/6.8 LC |
| 3,715,750 | 2/1973 | Bishop | 343/6.8 LC |
| 3,721,906 | 3/1973 | Geesen et al. | 343/6.5 LC X |
| 3,949,397 | 4/1976 | Wagner et al. | 343/6.5 R |
| 4,067,011 | 1/1978 | Althaus | 343/6.8 LC |

Primary Examiner—T. H. Tubbesing
Attorney, Agent, or Firm—Lowe, Kokjer, Kircher

[57] ABSTRACT

A single crystal controlled oscillator provides clock pulses that are used to drive both the decoder shift register and the encoder shift register of an ATC transponder. An input pulse of the interrogation signal from a ground station is shifted down in the decoder shift register and is time correlated with a subsequent pulse of the input signal to verify the validity of the interrogation. A valid interrogation signal triggers gate logic circuitry which loads data into the encoder shift register. The clock pulses from the oscillator are processed to the appropriate frequency for driving the encoder shift register, which outputs serial data for transmission as a coded reply signal responsive to the interrogation signal. The decoder shift register and cooperating edge trigger coincidence gate circuitry suppress side lobe interrogation signal and inhibit operation of the transponder when same are present.

10 Claims, 4 Drawing Figures

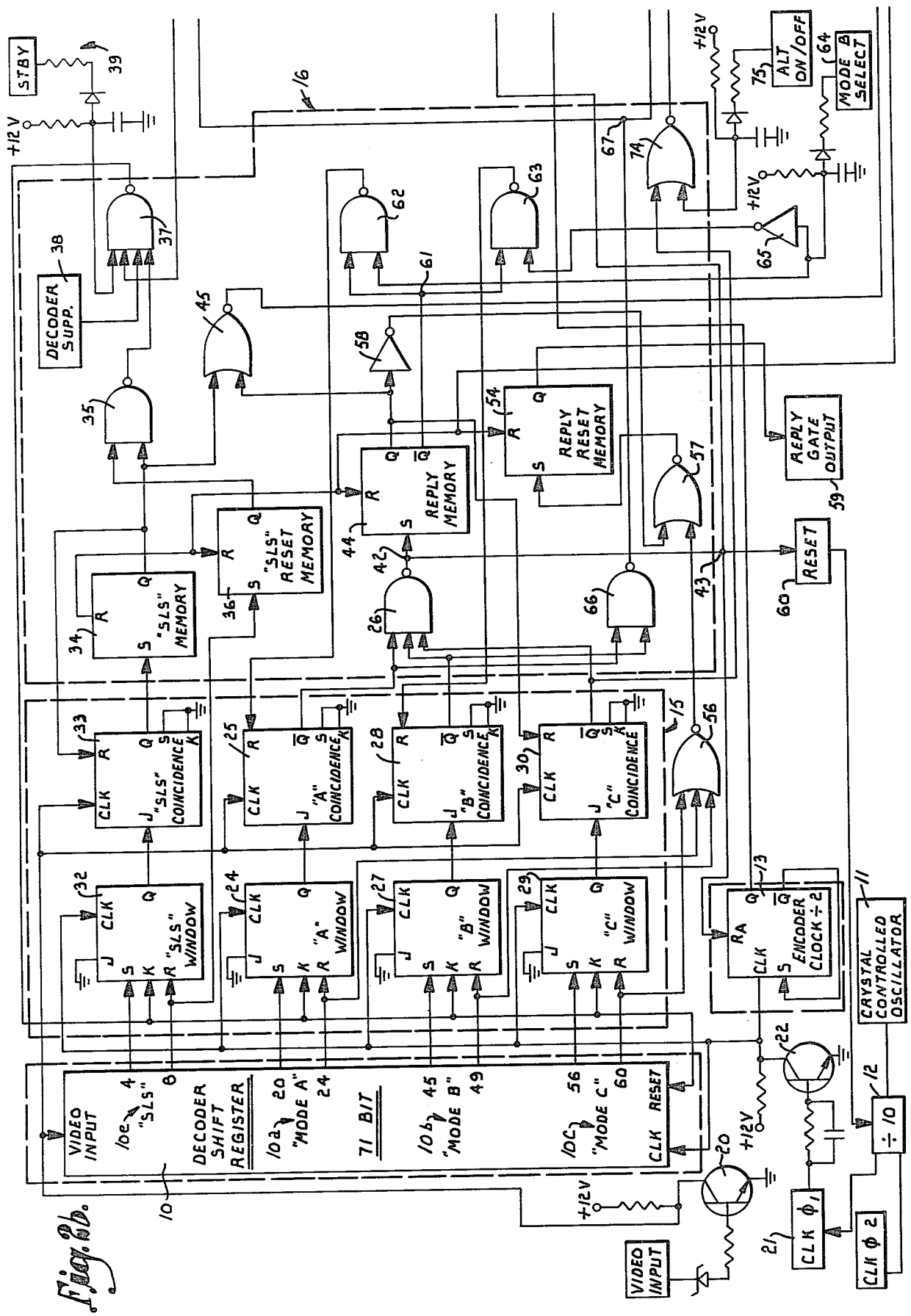

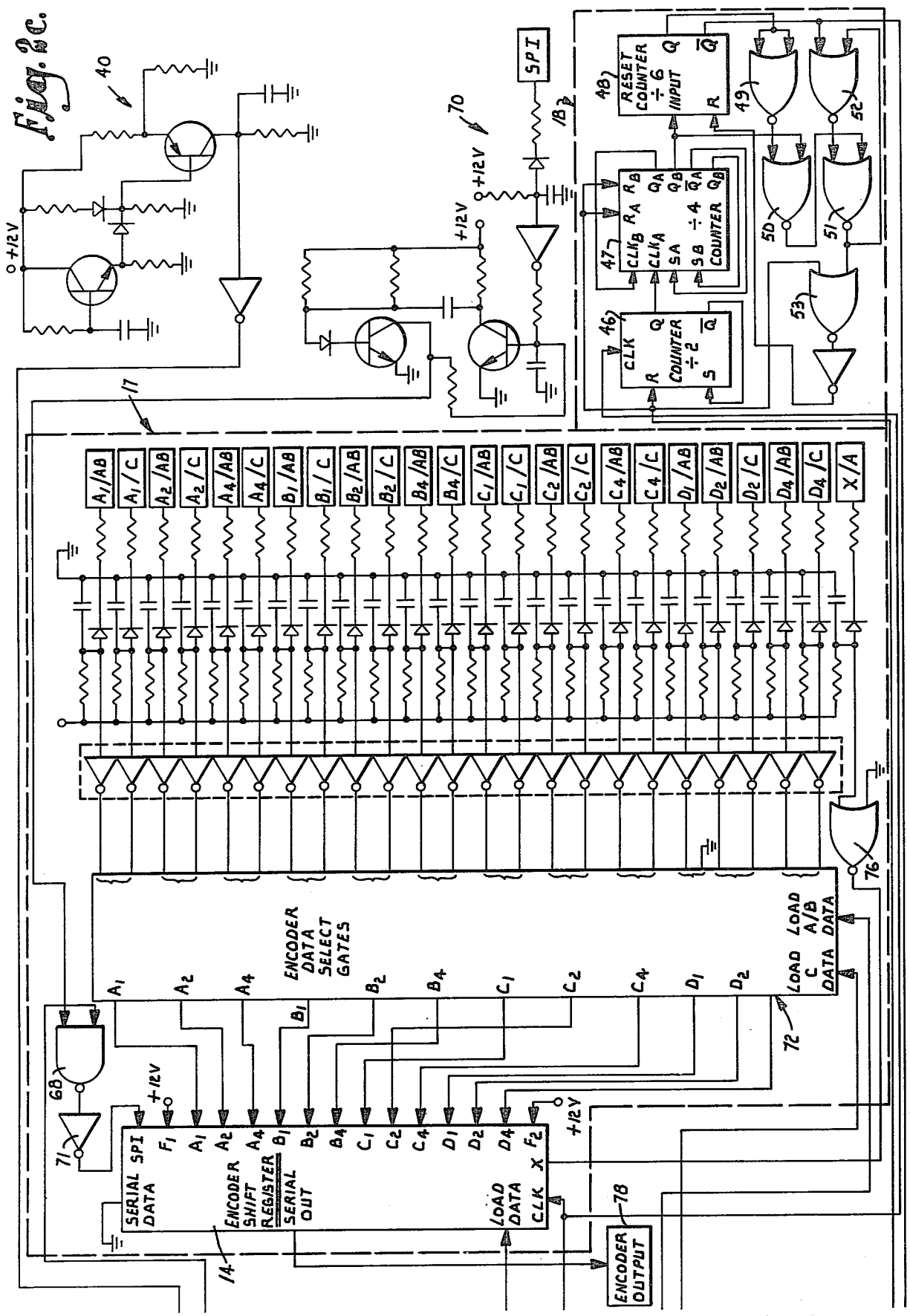

TRANSPONDER DECODER/ENCODER CIRCUITRY

BACKGROUND AND SUMMARY OF THE INVENTION

This invention relates generally to transponders and deals more particularly with improved decoder/encoder circuitry in an air traffic control transponder.

ATC transponders are installed in aircraft to receive interrogation signals which are transmitted by a ground station. The transponder decodes and validates the interrogation signal and transmits to the ground station a coded reply in the form of a pulse train containing identification of the aircraft and additional information such as altitude and the like.

Typically, the decoding and verification of the interrogation signal is performed by a shift register which is driven by a series of oscillator produced clock pulses. The incoming interrogation signal is a pulse train in which one pulse is shifted down from stage to stage by the shift register in order to adjust its timing for comparison with a subsequent pulse. The validity of the interrogation is verified in this fashion. Conventional ATC transponders further require an encoder clock for encoding the reply signal that is to be transmitted to the ground station. This has necessitated the use of two separate oscillators since each series of clock pulses (decode and encode) are of different frequency. The encoder clock is a 689.655 Khz clock because present specifications require a 1.45 microsecond time delay between pulses in the reply signal that is transmitted to the ground station. The frequency of the decoder clock is selected according to the desired size of the shift register and the width of the detection windows that are included in the decoder function.

Since the existing ATC transponders of this type require two separate oscillators, which are usually cyrstal controlled, the circuitry is rather complicated and tends to be overly expensive. The circuit cost and complexity are further increased because a timing circuit is required in order to properly time the operation of the two separate clocks. In addition, the clocks typically operate at relatively low frequency which involves restrictive specifications if adequate frequency stability is to be maintained. Another problem has been the excessive jitter associated with existing transponders and their unreliability, especially after prolonged use.

It is the primary object of the present invention to provide an ATC transponder which is improved in its operational and efficiency characteristics are compared to existing transponders.

Another important object of the invention is to provide, in conjunction with the operation of an ATC transponder, an economical and efficient method of performing the decoding and encoding functions. It is a particularly significant feature of the invention in this regard that the clock pulses from a single oscillator are utilized for both the decoding and encoding.

Yet another object of the invention is to provide an ATC transponder in which the circuitry is reduced in cost and complexity as compared to that of prior art transponders.

A further object of the invention is to provide a transponder of the character described in which the circuitry is particularly adapted for an LSI (Large Scale Integration) chip. Again, the use of a single oscillator is significant in that it lends itself to incorporation in an LSI chip better than existing circuits which require two oscillators.

An additional object of the invention is to provide a transponder of the character described which is able to maintain transmitter jitter at a relatively low level and which operates with improved reliability.

A still further object of the invention is to provide a transponder of the character described that requires only a single clock for both decoding and encoding, with the clock operating at a relatively high frequency for greater stability.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith, and in which like reference numerals are used to indicate like parts in the various views:

FIG. 2a is an organizational block diagram indicating the manner in which FIGS. 2b and 2c are to be organized; and FIGS. 2b and 2c are schematic diagrams which are to be organized as indicated in FIG. 2a and which illustrate the decoder/encoder circuitry of the transponder.

Figure 1:
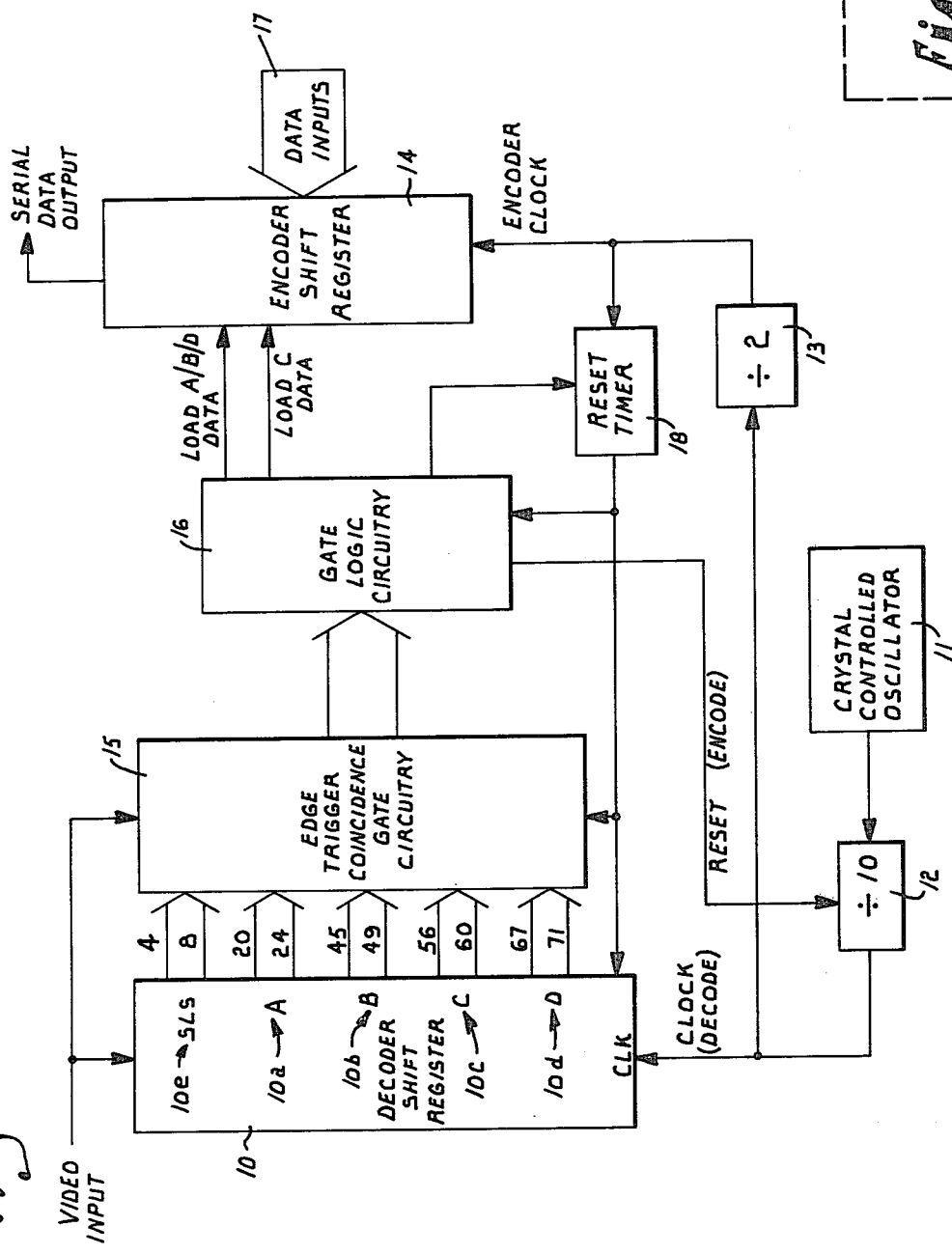
FIG. 1 is an operational block diagram illustrating the transponder decoder/encoder circuitry of the present invention.

Referring initially to the block diagram of FIG. 1, the improved ATC transponder of the present invention includes a decoder shift register 10 which receives a video input signal. The video input is a coded interrogation signal which is transmitted by a ground station and received by the aircraft transponder antenna (not shown). The interrogation signal is comprised of pulses which succeed one another by a specified time interval, for example eight microseconds if the signal is a mode A interrogation signal requesting the aircraft to identify itself. The purpose of the ATC transponder is to verify the validity of the interrogation signal and to transmit a reply signal to the ground station.

A crystal controlled oscillator 11 provides a series of clock pulses which are applied to a divide by ten circuit 12. Oscillator 11 operates at 27.5862 Mhz, and the output from the divide by ten circuit 12 is therefore a series of clock pulses at 2.7586 Mhz (or 0.3625 microseconds). The clock pulses from the divide by ten circuit 12 are applied as the clock input to the decoder shift register 10, and are also routed to a divide by two circuit 13. After processing the clock pulses, the divide by two circuit 13 applies the resultant 1.3793 Mhz clock pulses to an encoder shift register 14 as the encoder clock input thereto.

The 2.7586 Mhz clock pulses which are routed to the decoder shift register 10 are utilized to shift down the first video input pulse from stage to stage. Shift register 10 is preferably a 71 bit shift register which includes a mode A function 10a, a mode B function 10b, a mode C function 10c, and it may also include a mode D function 10d. The mode A function of the shift register operates between the 20th and 24th bits, the mode B function operates between the 45th and 49th bits, the mode C function operates between the 56th and 60th bit, and the mode D function (if provided) operates between the 67th and 71st bits. Decoder shift register 10 further includes a side lobe suppression or SLS function 10e which operates between the 4th and 8th bits to inhibit the system when side lobe interrogation occurs, indicating an invalid interrogation.

When the first pulse of the video input signal to the decoder shift register 10 has been shifted down between 20 clock pulses (or 20 × 0.3625 microseconds = 7.25 microseconds) and 24 clock pulses (24 × 0.3625 microseconds = 8.7 microseconds), an output pulse is fed by the mode A function 10a to the edge trigger coincidence gate circuitry 15. The coincidence gate circuitry 15 receives the second pulse of the video input signal and compares it with the shifted down first pulse which is applied by the mode A function 10a. If time coincidence occurs betwen the pulses, a valid mode A interrogation is indicated, and circuit 15 outputs to the gate logic circuitry 16.

The other mode functions 10b, 10c and 10d cooperate with circuit 15 in similar fashion to verify the validity of the interrogation signal in modes B, C, and D, respectively. If a valid interrogation signal in any of the modes is indicated, circuit 15 triggers the gate logic circuitry 16 which applies a load A/B/D data input or a load C data input to the encoder shift register 14, depending on which mode was interrogated.

Additional data inputs to the encoder shift register 14 are indicated by numeral 17 in FIG. 1. The encoder shift register 14 is driven by the 0.725 microsecond encoder clock pulses that are applied from the divide by two circuit 13. The data that is loaded into the encoder shift register 14 is encoded by the encoder shift register as serial data output which goes to a transmission modulator (not shown) and is eventually transmitted to the ground station as a coded reply signal to the interrogation signal.

Upon verification of a valid interrogation signal, the gate logic circuitry applies a reset (encode) pulse to the divide by ten circuit 12. This resets the clock circuity so that the clock is synchronized with the decoded reply from circuit 16 to assure a proper time delay between receipt of the second pulse and output of the data. The gate logic circuitry 16 also applies a pulse to a reset timer 18 which inhibits the decoder for a preselected time interval (34.8 microseconds). Decoding is thereby prevented during transmission so that the possibility of interference between decoding and transmission is eliminated.

Figures 2A, 2B, 2C:
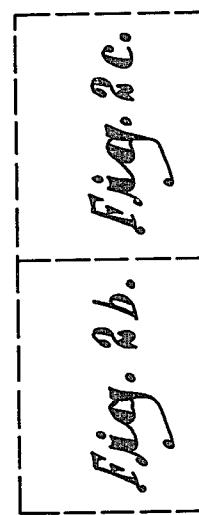

Referring now to the more detailed schematics of FIGS. 2b and 2c, the video input is applied to a transistor 20 prior to being routed to the decoder shift register 10 and the edge trigger coincidence gate circuitry 15. The clock pulses from the divide by ten circuit 12 are applied to a phase one clock circuit 21, the output of which is buffered to the proper level for shift register operation by a transistor 22. The output of transistor 22 is routed to the decoder shift register 10 as the clock input thereto, and also to the encoder divide by two circuit 13 which applies 0.725 microsecond pulses as the clock input to the encoder shift register 14 (see FIG. 2c).

The mode A function 10a of the decoder shift register 10 coacts with a mode A window 24 which is part of the edge trigger coincidence gate circuitry 15. When the first video input pulse has been shifted down 20 cycles (or 7.25 microseconds) in shift register 10, window 24 is opened by a JK flip-flop. The JK flip-flop closes window 24 at the 24th bit (or at 8.7 microseconds). The Q output pulse which is delivered by window 24 during its open period is applied to a mode A coincidence window 25 as the J input thereto. Window 25 also includes a JK flip-flop. Window 25 receives the second pulse of the video input signal and compares it with the shifted down first pulse from window 24. If the pulses arrive substantially in time coincidence, they are between 7.25 and 8.7 microseconds apart (nominally 8 microseconds apart), and the interrogation signal is therefore a valid mode A interrogation. The output of window 25 is then supplied to a reply gate 26 which is included in the gate logic circuitry 16.

The mode B, C, and D functions of the decoder shift register 10 operate similarly to detect the presence of a valid interrogation signal in the various modes. The mode B function 10b outputs to a mode B window 27 after the first video input pulse has been shifted between 45 and 49 bits. The Q output from window 27 is the J input to a mode B coincidence window 28 which receives the second input pulse and compares it with the shifted down first pulse to verify the validity of the mode B interrogation. Window 28 outputs to the reply gate 26 if mode B is detected in the interrogation signal. The mode C function 10c has a mode C window 29 which operates between the 56th and 60th bits. A mode C coincidence window 30 receives as its J input the Q output from window 29 and also the second pulse of the video input signal. Window 30 outputs to the reply gate 26 in the event that a valid mode C interrogation is indicated.

The mode D function 10d and its windows are omitted from FIG. 2b for simplicity since mode D is used infrequently, if at all. However, it should be noted that mode D may be provided and that its implementation is between the 67th and 71st bits as indicated in FIG. 1.

As previously suggested, the SLS function 10e of the decoder shift register operates between the 4th and 8th bits to inhibit the system if the pulse spacing of the video input is 2 microseconds, indicating invalid side lobe interrogation. The SLS function 10e operates similarly to the mode functions that were previously described. An SLS window 32 receives the first video input pulse after same has been shifted down between 4 and 8 bits by the decoder clock. Window 32 provides a Q output which is the J input to an SLS coincidence window 33 which receives the second video input pulse and compares it with the shifted down first pulse to determine the time correlation therebetween. In the event of such time correlation, indicating an invalid side lobe interrogation, the Q output from the SLS coincidence window 33 is applied as the S input to an SLS memory 34 rather than going to the reply gate 26 as is the case with modes A-D.

The Q output of SLS memory 34 is routed to an SLS reset gate 35, and also back as the RESET input to SLS coincidence window 33. The SET input to an SLS reset memory 36 is supplied from the 8th data bit of the SLS function 10e, indicating closing of the SLS window. The Q output from SLS reset memory 36 is applied to gate 35 as the other input thereto.

The output of the SLS reset gate 35 goes to a decoder suppression gate 37 which has additional inputs from a decoder suppression 38 and a standby circuit which is generally designated by numeral 39. The fourth input to gate 37 is supplied by a turn on delay circuit which is shown in FIG. 2c and designated generally by numeral 40. The turn on delay circuit 40 inhibits operation of the system in a conventional manner for a selected time interval (47 seconds) after initial turn on. The output of the decoder suppression gate 37 (FIG. 2b) is routed to windows 24, 27, 29 and 32 as the K inputs thereto, and the decoder suppression gate output is also routed to the decoder shift register 10 as a reset input thereto. Gate 37 thereby inhibits operation of decoder shift register 10 if an invalid side lobe interrogation occurs.

The output from the reply gate 26 (indicating the presence of a valid mode A, B, C or D interrogation) is routed through nodes 42 and 43, and from the latter node is applied to the encoder shift register 14 as a load data input thereto (see FIG. 2c). The output of reply gate 26 is also routed through node 42 to a reply memory 44 as the S input thereto. The RESET input to reply memory 44 comes from the reset timer 18, as will be explained. The Q output of the reply memory 44 is routed to a counter enable gate 45 which also receives the Q output from the SLS memory 34. The output of the counter enable gate 45 goes to the reset timer 18 which serves to inhibit operation of the decoder during transmission, as suggested previously.

With reference to FIG. 2c, the reset timer 18 includes a counter divide by two circuit 46, a counter divide by four circuit 47, and a reset counter divide by six circuit 48. The RESET input to the counter divide by two circuit 46 comes from the counter enable gate 45, and the 0.725 microsecond clock from the divide by two circuit 13 provides the clock input to circuit 46. Feedback gates 49–52 and a reset gate 53 are included in the reset timer circuit 18. Circuits 46, 47 and 48 process the 0.725 microsecond input to provide a 34.8 microsecond output from the reset timer 18. This 34.8 microsecond output from the reset timer is applied to the SLS memory 34, to the SLS reset memory 36, to the reply memory 44, and to a reply reset memory 54, as the RESET input to each (see FIG. 2b).

With continued reference to FIG. 2b, a first reset gate 56 is initiated by the closing of the mode A window 24, the closing of the mode B window 27, or the closing of the mode C window 29. The output of gate 56 goes to a second reset gate 57, the other input of which comes from the Q output of reply memory 44 after being inverted by inverter 58. The output of the second reset gate 57 is applied to the reply reset memory 54 as the S input thereto. The output of reply reset memory 54 is the reply gate output, as indicated at 59.

The output from the reply gate 26 is additionally routed through nodes 42 and 43 to the encoder clock divide by two circuit 13 as an RA input. The reply gate output is further routed from node 43 to a reset circuit 60 which outputs a reset pulse to the clock divide by ten circuit 12. This resets the clock circuitry for synchronization in conjunction with the decoded reply in order to assure proper timing in the performance of the encoding function.

The Q̄ output of the reply memory 44 goes to a node 61, from where it is routed to an A select gate 62 and to a B select gate 63. The other inputs to gates 62 and 63 are provided by a mode B select control 64, with an inverter 65 inverting the input to the mode B select gate 63. The output of gate 62 is applied as the RESET input to the A coincidence window 25. The output of gate 63 is applied as the RESET input to the mode B coincidence window 28.

The outputs of both the mode A coincidence window 25 and the mode B coincidence window 28 are routed to a load A/B/D data gate 66. The output of gate 66 goes to a node 67, from which it is routed as one input to an SPI gate 68 (see FIG. 2c). The other input of the SPI gate 68 comes from an SPI circuit which is generally designated by reference numeral 70 in FIG. 2c. After passing through inverter 71, the output of gate 68 is applied as an SPI input to the encoder shift register 14.

From node 67, the output of the load A/B/D data gate 66 is routed as a load A/B data input to the encoder data select gates which are shown in FIG. 2c and designated generally by numeral 72. The encoder select gates 72 form part of the data inputs 17 which are shown in FIG. 1 and which cooperate to enter data into the encoder shift register 14.

With reference again to FIG. 2b, the output of the mode C coincidence window 30 is routed to an altitude report gate 74. The other input to gate 74 comes from an alt on/off control 75. The output of the altitude report gate 74 goes to the encoder data select gates 72 as a load C data input (see FIG. 2c). The mode C data is thus loaded into the encoder shift register 14 separately from the mode A or B (or mode D) data. An X select gate 76 shown in FIG. 2c provides an X input to the encoder shift register 14.

As indicated previously, the encoder shift register 14 is driven by the 0.725 microsecond encoder clock in order to shift the loaded data through the serial series shift register. The output of the encoder shift register is a serial out signal which provides the encoder output 78 that is the basic coded reply to the interrogation signal. This reply signal is then routed to a modulator (not shown) and to the transmitter of the transponder for transmission to the ground station as a reply to the interrogation.

It is noted that the 0.725 microsecond encoder clock is actually half as fast as the specified 1.45 microsecond output that is to be transmitted to the ground station. Therefore, a separation occurs in the shift register so that the data is outputted directly at twice the speed of the clock. This eliminates the need for a gating action at the output, although it is of course possible to drive the shift register with a 1.45 microsecond clock and gate the output.

It is thus apparent that the subject invention utilizes a single oscillator to provide the clock for both the decoding and encoding functions. Accordingly, the need for two separate clocks is eliminated along with the complex and costly circuitry associated therewith. Furthermore, the decoding and encoding functions are accomplished in a unique and improved manner as compared to existing transponders.

From the foregoing, it will be seen that this invention is one well adapted to attain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a transponder adapted to receive a coded interrogation signal having a plurality of input pulses, the improvement comprising:

single clock means for producing a first series of clock pulses having a first predetermined frequency;

a decoder means for decoding and validating said coded interrogation signal, said decoder means comprising validating circuitry and a decoder shift register connected to receive said input pulses and said first series of clock pulses, said decoder shift register being driven by said first series of clock pulses and operable with said validating circuitry to correlate said input pulses to determine the validity of said interrogation signal, said decoder means being operable to produce a validation signal in response to a determination that said interrogation signal is valid;

means for providing a reply signal in response to said validation signal;

means for deriving a second series of clock pulses from said first series of clock pulse said second series of clock pulses having the frequency different from the frequency of said first series of clock pulses;

means for encoding said reply signal, said encoding means comprising an encoder shift register connected to receive said reply signal and said second series of clock pulses, said second series of clock pulses being operable to drive said encoder shift register to produce a coded reply signal in response to an interrogation signal that is valid; and synchronizing means for establishing a set time delay between production of said validation signal and production of said coded reply signal.

2. The invention of claim 1, wherein said decoding means includes means associated with said decoder shift register for suppressing side lobes of the interrogation signal.

3. The invention of claim 1, including means for inhibiting the operation of said decoding means for a preselected time period following the determination that said interrogation signal is valid.

4. The invention of claim 1, wherein the means providing a reply signal comprises gate logic circuitry coupled with said decoding means and operable to apply the reply signal to said encoder shift register in response to said validation signal.

5. The invention of claim 4, including a reset timer circuit coupled with said gate logic circuitry and activated thereby to inhibit said decoding means for a preselected time period following the determination that said interrogation signal is valid.

6. The invention of claim 1, wherein said single clock means comprises a crystal controlled oscillator operating at a frequency greater than said first predetermined frequency of the first series of clock pulses, and means for reducing the frequency of the pulses from said oscillator to said first predetermined frequency.

7. The invention of claim 6, wherein said deriving means comprises means for reducing the frequency of said first series of clock pulses below said first predetermined frequency produce said second series of clock pulses.

8. A method of validating and replying to an interrogation signal having first and second input pulses, said method comprising the steps of:

producing a first series of clock pulses having a predetermined frequency; utilizing said first series of clock pulses to shift down the first input pulse of said interrogation signal from stage to stage;

comparing said first pulse, after same has been shifted down a preselected number of stages, with the second pulse of said interrogation signal to determine whether there is time correlation therebetween and thus whether the interrogation signal is valid;

producing a reply signal in response to the determination of a valid interrogation signal;

deriving a second series of clock pulses from said first series of clock pulses having a different frequency than the first series;

establishing a set time delay in response to the determination of a valid interrogation signal; and utilizing said second series of clock pulses after said set time delay to shift said reply signal in a manner to encode same, thereby providing a coded reply signal responsive to the interrogation signal.

9. A method as set forth in claim 8, including the step of suppressing side lobes in the interrogation signal.

10. A method as set forth in claim 8, including the step of inhibiting the shifting down of the input pulses for a preselected time period following the production of the reply signal.

* * * * *